United States Patent
Veits

(10) Patent No.: US 7,839,769 B2
(45) Date of Patent: Nov. 23, 2010

(54) METHOD FOR THE ORGANIZATION OF NETWORK NODES IN A PACKET-SWITCHED NETWORK

(75) Inventor: Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 12/283,407

(22) Filed: Sep. 11, 2008

(65) Prior Publication Data

US 2009/0086743 A1    Apr. 2, 2009

(30) Foreign Application Priority Data

Sep. 28, 2007    (EP)    ................... 07019154

(51) Int. Cl.
*G01R 31/08* (2006.01)

(52) U.S. Cl. ................... 370/219; 370/221

(58) Field of Classification Search ........... None
See application file for complete search history.

(56) References Cited

U.S. PATENT DOCUMENTS

| | | | |
|---|---|---|---|
| 5,935,215 A | 8/1999 | Bell et al. | |
| 6,954,436 B1 * | 10/2005 | Yip et al. | 370/254 |
| 7,490,161 B2 * | 2/2009 | Ren | 709/238 |
| 7,567,505 B2 * | 7/2009 | Iijima et al. | 370/216 |
| 7,610,405 B1 * | 10/2009 | Moberg et al. | 709/242 |
| 2003/0202473 A1 | 10/2003 | Patrick et al. | |
| 2004/0117251 A1 | 6/2004 | Shand | |
| 2006/0092975 A1 * | 5/2006 | Ansari et al. | 370/469 |
| 2006/0233181 A1 * | 10/2006 | Raszuk et al. | 370/401 |
| 2007/0055789 A1 * | 3/2007 | Claise et al. | 709/234 |
| 2007/0149139 A1 * | 6/2007 | Gauvreau | 455/69 |

OTHER PUBLICATIONS

Hinden R et al: "Virtual Router Redundancy Protocol (VRRP); rfc3768.txt:" IETF Standard, Internet Engineering Task Force, IETF, CH, Apr. 2004. XP015009548; ISSN: 0000-0003; Others; 2004.

* cited by examiner

*Primary Examiner*—Hong Cho
*Assistant Examiner*—Eunsook Choi

(57) ABSTRACT

There is described a method to organize a network, wherein if for a first router set up as the default gateway an inaccessibility of an assigned network element is detected at an interface of the first router a second router is set up as the logical default gateway. In this case a provision is made such that in the course of setting up the second router as the default gateway a check on the interface metric is performed at the first and/or second router and that in consequence of the inaccessibility detected for the interface an adaptation of the interface metric is carried out. The interface metric is propagated for example by way of the routing protocol OSPF and/or EIGRP and/or IS-IS to other routers. When using the method it is possible in a failure scenario with divided Layer-2 networks to avoid an occurrence of "black holes", in other words gaps in communication. Moreover asymmetric routing, which is caused by a changeover of the logical gateway from the first router to the second router, can be eliminated. The danger of an excessive exchange of unicast messages, which can result in a high failure level of all participating network nodes and network node elements, is thus also excluded.

20 Claims, 1 Drawing Sheet

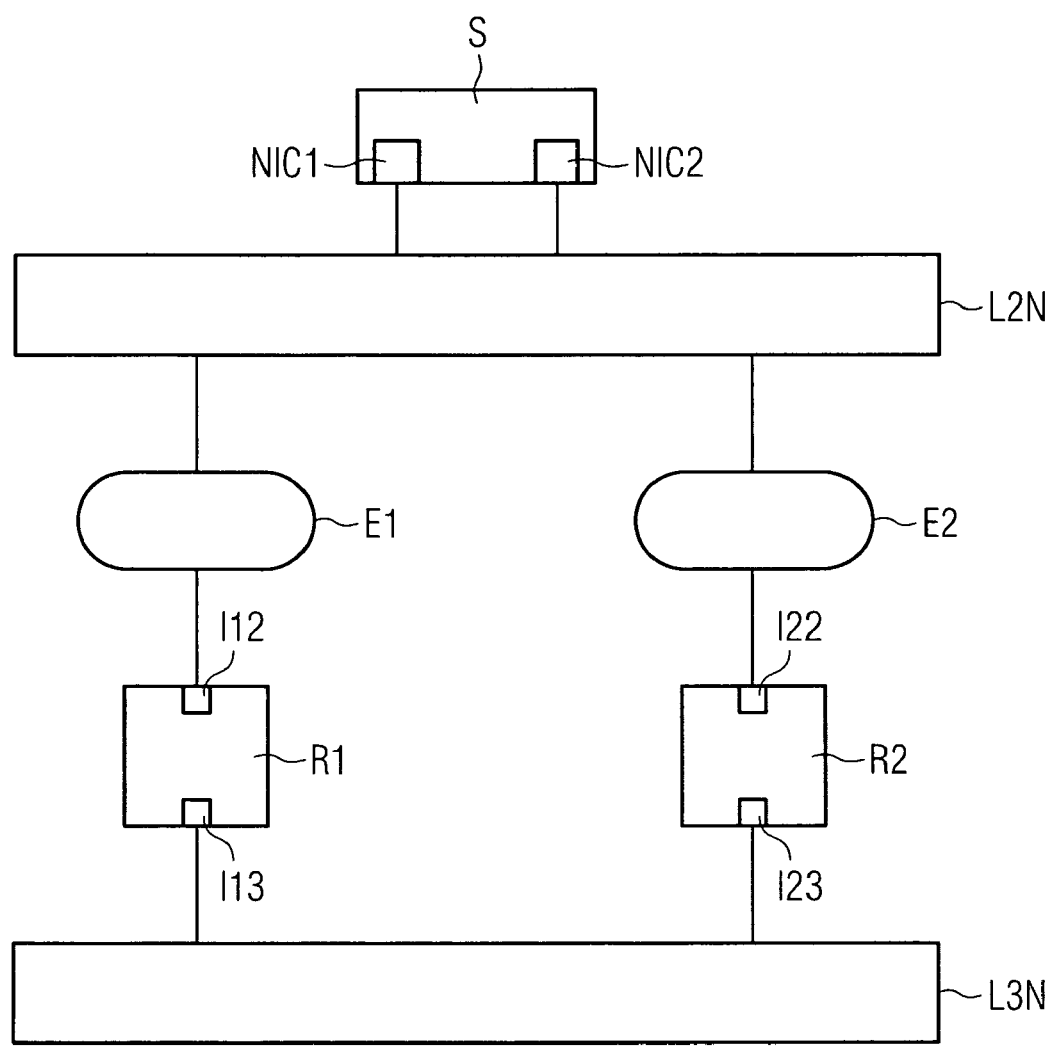

METHOD FOR THE ORGANIZATION OF NETWORK NODES IN A PACKET-SWITCHED NETWORK

CROSS REFERENCE TO RELATED APPLICATIONS

This application claims priority of European application No. 07019154.9 EP filed Sep. 28, 2007, which is incorporated by reference herein in its entirety.

FIELD OF INVENTION

The invention relates to a method for the organization of network nodes.

BACKGROUND OF INVENTION

Network node elements are known on the level of the Network Layer, or Layer 3. Such a network node element has at least three interfaces, at which data packets are exchanged bidirectionally with network elements of a packet-switched network (for example computer systems or "hosts") and/or with other network node elements.

Such types of network node elements are also referred to in professional circles as "routers". Depending on the application of the network node element, further functions are added, with the result that in addition to the designation "router" further designations exist for specifically embodied network node elements. For reasons of a simple description the term router is used in the following without excluding further specifically embodied network node elements through this and without restricting the universality of the network node element described.

In a router, essentially two processes are brought to execution. A first process accepts a data packet arriving at an interface of the router and determines an interface of the router to which the data packet is forwarded. This first process is called forwarding. In order to determine an interface to which the incoming data packet is forwarded, a routing algorithm is used which, on the basis of entries in the data packet and on the basis of information maintained in the router regarding the environment of the router, determines an interface for the outbound data packet.

A second process is used for managing the routing algorithm with the objective of optimizing the algorithm to the effect that the choice of the interface for the outbound data packet is as efficient as possible in terms of a short path in the packet-switched network. In addition to the path determination ("routing"), which should be as short as possible, further criteria are added, to which the routing algorithm is normally to be optimized.

One form of managing the routing algorithm which is well-established today is also referred to as "adaptive routing". In the case of adaptive routing—in contrast to a static routing process—changes in the data traffic and in the topology of the packet-switched network are taken into consideration for an adaptation of the routing algorithm. To this end the router communicates—by means of the aforementioned second process—with neighboring routers in order to determine their connection status and to determine a "metric" for optimizing the routing algorithm. In this situation, the best possible paths are entered in a routing table, while link-state or topological databases contain information relating to the connection status and to the environment of the router. In a general manner, the concept of the routing table is often used for a combination of the aforementioned functional units routing table, link-state and/or topological databases.

The metric, also referred to as "interface metric", provides a measure for determining the most efficient path. With the aid of the metric, the routing algorithm determines whether one choice of an interface of the router—and thus a chosen path—is more efficient in comparison with another. In the case of a plurality of possible interfaces, it is customarily the interface that exhibits the smallest metric which is selected. The interface with the smallest metric is for example that interface for which a resulting path has the minimum distance to the destination system. In addition to the distance, further criteria can be incorporated into the metric, such as for example the bandwidth which can be achieved on a path, the delay to be expected on a path, the number of network node elements situated on the path ("hop count"), etc.

With regard to a path determination for data packets through networks, any failure of sections on the path to the destination is countered by the dynamic routing described above. However, if the first router on a path fails, then this fault can often not be cleared by means of dynamic routing.

One reason for such an inevitable gap consists in the fact that one router, which guarantees communication with other (partial) networks at the edge of the partial network, is normally noted as the direct "contact partner" for a host or a plurality of hosts. The address of this router is normally noted statically in the respective host. The corresponding router is often referred to as the "default gateway".

Unless additional measures are taken, following a failure of the first router, or default gateway, the affected hosts would be cut off from any communication extending beyond the partial network, even if still active routers were available in the same partial network.

In order to solve this problem, protocols for increasing availability while using redundant default gateways have been proposed, which are classified as a protocol family FHRP (First-Hop Routing Protocol). The HSRP protocol (Hot Standby Router Protocol) from the company Cisco Systems Inc., San Jose, Calif., USA, makes provision for combining a plurality of routers to form a logical group which is addressed over the packet-switched network as a logical default gateway. The alternative protocols VRRP (Virtual Router Redundancy Protocol) and also GLBP (Gateway Load Balancing Protocol) pursue the same objective with similar methods.

The aforementioned protocols for increasing availability react to a failure of a router within a redundant combination of routers by switching to a different router, whereby the address of the logical default gateway remains unchanged.

In the event of a failure of a first router, which was operating up to that point as the default gateway, a second router assumes the role of the logical default gateway. To this end, a virtual IP address (Internet Protocol) and a virtual MAC address (Media Access Control) of the first router are transferred to the second router which thus assumes the function of the logical default gateway. By transferring the MAC address and the IP address to the second router, this means that a particular host in the partial network can still use the address, noted statically in the host, of the logical default gateway in order to address the logical default gateway, even though after the failure of the first router the second router henceforth assumes the function of the logical default gateway. The hosts do not therefore need to undertake any updating of their addresses maintained in a respective ARP cache (Address Resolution Protocol).

Although within the partial network the course of action described above involving the use of protocols for increasing the availability of the default gateway guarantees a connection beyond the boundaries of the partial network into other networks, it does however result in the fact that the first router relinquishing the role of the default gateway does not take the switch of default gateway into consideration in all interfaces. This can result in communication connections from another (partial) network continuing to be routed by way of the first router, which however is unable to establish any connection with its associated host.

SUMMARY OF INVENTION

An object of the present invention is to set down an improved method for organizing a network.

The object is achieved in respect of its method aspect by a method having the features described in an independent claim and in respect of its device aspect by an arrangement.

The invention makes may use of a method for the organization of network nodes or routers in a packet-switched network, in which in a packet-switched network in the situation when an at least partial inaccessibility of a network element assigned to a first network node is detected at an interface of the first network node, a second network node is set up as the default gateway. For this purpose, for example, the aforementioned protocols for increasing availability are used, which react to a failure of a network node within a redundant combination of network nodes by switching to a different network node, whereby the address of the logical default gateway remains unchanged.

The method is characterized in that during the process of setting up the second network node as the default gateway a check of the interface metric is performed at the first and/or second router and that in consequence of the inaccessibility detected for the interface an adaptation of the interface metric is performed.

When the method is used, a switch of default gateway is thus combined in an advantageous manner with management of the interface metric. This measure ensures that asymmetric routing is avoided under all circumstances.

Advantageous developments of the invention are set down in the subclaims.

BRIEF DESCRIPTION OF THE DRAWINGS

An example with further advantages and embodiments of the invention will be described in detail in the following with reference to the drawing.

In this situation the single FIGURE shows a section of a packet-switched network comprising a plurality of partial networks with associated functional components.

DETAILED DESCRIPTION OF INVENTION

The FIGURE shows a server S which is connected to a Layer-2 network L2N. A connection is implemented for example by way of two network interfaces NIC1, NIC2. For use of the present invention, two network interfaces NIC1, NIC2 are however optional. Instead of this, the server S can also be connected by way of an interface.

A first router R1 and a second router R2 are connected to the Layer-2 network. On the side of the first router R1 the connection to the Layer-2 network passes by way of a transmission medium E1 (Ethernet); accordingly, on the side of the second router R2 a connection with the Layer-2 network passes by way of a second transmission medium E2 (Ethernet).

Let a first interface I12 of the router R1 be the preferred interface I12 in the direction of the Layer-2 network on account of its favorable interface metric. Correspondingly, let a first interface I22 of the router R2 be a preferred interface in the direction of the Layer-2 network. Let a second interface I13 of the router R1 be a preferred interface in the direction of the Layer-3 network L3N. Correspondingly, let a second interface I23 of the router R2 be a preferred interface I23 in the direction of the Layer-3 network L3N.

A plurality of network elements, or "clients" C1, C2 and C3 are connected to the Layer-3 network.

In the present network or partial network, let the router R1 be the default gateway of the server S. This means that router R1 takes up the "active" HSRP state or VRRP state.

Data packets sent by the server S, which have one of the clients C1, C2, C3 as their destination, are thus routed by way of the default gateway, the router R1. In order to avoid an excessive incidence of "unicast" messages in the Layer-2 network it is advantageous to route data packets in the reverse direction, in other words from one of the clients C1, C2, C3 toward the server S, likewise by way of the first router R1. Such a measure avoids so-called asymmetric routing, which would result in an uneven capacity utilization of the routers R1, R2 or where applicable also of the network interfaces NIC1, NIC2. In order to avoid this, a lower value of interface metric is normally chosen on the part of a network administrator for the interface I12 than for the interface I22. With the lower interface metric, this means that an associated path including the interface I12 is selected by preference.

In the following it is assumed that as a consequence of a fault in the Layer-2 network L2N no further connection is possible between the first router 1 and the server S. The second router R2 however can still access the server S. By using an "Enhanced Object Tracking" method it is possible to ensure that the second router R2 takes up the "active" HSRP state or VRRP state. Such an assumption of the "active" state corresponds to a handover of the function of the logical default gateway from the first router R1 to the second router R2.

Such a handover takes place even if the second router R2 still receives the signs of life (or Hello messages) provided in the HSRP or VRRP protocol from the side of the first router R1. Should such types of Hello messages be entirely absent from the side of the router R1, the second router R2 would anyway take up the role of the logical default gateway or the "active" HSRP state or VRRP state. On taking up this active state the second router R2 becomes the new default gateway of the server S.

In routers commonly used today a switch in the HSRP or VRRP state to the interfaces I12 and I22 has no influence on the routing algorithm or the respective interface metric. If therefore the transmission medium E1 is still active but the first router R1 is unable to access the server S for any other reason whatsoever, with current routers this has no influence on a propagation of the interface metric through the first router R1 to further routers—not shown—of the Layer-2 network.

This means that the first router R1 would, although it is unable to establish a connection with the server S, continue to propagate the set small routing metric in the direction of the Layer-2 network. Consequently, data packets sent in the opposite direction, in other words by one of the clients C1, C2, C3 in the direction of the server S, would also continue to be routed by way of the first router R1. This router is however, on account of the circumstances described previously, not able to forward the data packets received at the second interface I13 by way of the first interface I12 to the server S. Any communication intended for the server S would thus end at the first router R1 ("black hole").

In order to avoid the previously described black hole the proposal has been made to design the Layer-2 network in a highly redundant fashion such that only multiple failures can result in a disruption of the Layer-2 network L2N. Such a measure is however cost-intensive and can contribute to a destabilization of the network. For example, spanning tree loops can occur in this situation which can result in a considerable negative effect on the entire network. In severe cases, none of the servers present in a network can be accessed. Moreover, fault finding in a spanning tree is a highly complex and elaborate task.

In the following, an application of the method is described which comprises important advantages when compared with the workaround solution described above.

In one embodiment of the method provision is made for using the "Enhanced Object Tracking" method in order to carry out a manipulation of the interface metric on the side of the first interface I12 of the first router R1 or on the side of the first interface I22 of the second router R2. If the first router R1 is unable to access the server S, according to this embodiment provision is made for increasing the interface metric of the first interface I12, even for the case in which the transmission medium E1 is operating properly.

With the aid of a routing protocol such as for example OSPF (Open Shortest Path First), IS-IS (Intermediate System to Intermediate System protocol) or EIGRP (Enhanced Interior Gateway Routing Protocol), a change in the interface metric is propagated to the remaining routers. On the side of the Layer-3 network this ensures that data packets sent by the clients C1, C2, C3 in the direction of the server S are now forwarded by way of the second router R2 instead of by way of the first router R1.

When the method is used, the HSRP or VRRP state of the router R1 is thus coupled with the interface metric in the direction of the transmission medium E1. This measure ensures that asymmetric routing is avoided under all circumstances.

In one scenario given as an example the first router R1, which up to now was provided as a forwarding network node element for data paths in the Layer-3 network, could then decide to reduce its HSRP or VRRP priority and thus hand over the "active" state to the second router R2. Should the method not be implemented in this case, asymmetric routing then inevitably occurs. Data packets sent by the server S in the direction of the clients C1, C2, C3 are then forwarded by way of the second router R2, while packets sent in the opposite direction by the clients C1, C2, C3 are forwarded in the direction of the server S through the first router R1. Such asymmetric routing can, as described, result in an excess of unicast message traffic ("unicast flooding").

In contrast, the method makes provision for also using the path determination criteria used in the HSRP or VRRP protocols for making a decision which changes or increases the interface metric in the direction of the transmission medium E1. This measure serves to eliminate asymmetric routing.

To summarize, the method offers the following advantages. On the one hand, it is possible in a failure scenario with divided Layer-2 networks to avoid an occurrence of "black holes", in other words gaps in communication. Moreover asymmetric routing, which is caused by a changeover of the logical gateway from the first router R1 to the second router R2, can be eliminated. The danger of an excessive exchange of unicast messages, which can result in a high failure level of all participating network nodes and network node elements, is thus also excluded.

The embodiment of the invention described above represents a special implementation which can be adapted where necessary for a chosen configuration.

Stated more generally, the field of application of the method shows that if for the first router R1 (first network node) set up as the default gateway an inaccessibility of an assigned network element, in this case the server S, is detected at an interface I12 of the first router R1, the second router R2 is set up as the logical default gateway, whereby the invention makes provision such that in the course of setting up the second router R2 as the default gateway a check on the interface metric is performed at the first and/or second router R2 and that in consequence of the inaccessibility detected for the interface I12 an adaptation of the interface metric is carried out.

The method therefore is a combination of a routing protocol from the known FHRP protocol family (First-Hop Routing Protocol) for increasing the availability of a default gateway in conjunction with a check, adaptation and propagation of the interface metric.

The invention claimed is:

1. A method for an organization of network nodes in a packet-switched network, comprising:
    providing a server having a first server interface and a second server interface;
    providing a first network node having a first interface and a second interface, the first interface of the first network node being connected to the first server interface;
    providing a second network node having a first interface and a second interface, the first interface of the second network node being connected to the second server interface;
    providing a plurality of network elements connected to the first network node via the second interface of the first network node and/or the second network node via the second interface of the second network node;
    setting the first network node to be a default gateway such that the network elements transmit messages to the server via the first network node;
    changing the second network node to become the default gateway when at least partial inaccessibility of at least one of the network elements to the server is detected at the first interface of the first network node;
    performing a check on an interface metric of at least one of the first network node and the second network node after the detection of the at least partial inaccessibility of at least one of the network elements when changing the second network node to become the default gateway; and
    adapting the interface metric subsequent to and as a consequence of the at least partial inaccessibility of at least one of the network elements to the server via the first network node, the adapting of the interface metric being configured to cause the network elements which would otherwise communicate with the server via the first network node to instead communicate with the server via the second network node to avoid occurrences of asymmetric routing.

2. The method as claimed in claim 1, wherein the interface metric is propagated to at least one further network node in the network.

3. The method as claimed in claim 2, wherein the interface metric is set based upon the Enhanced Object Tracking protocol.

4. The method as claimed in claim 2, wherein the interface metric is propagated into further networks connected to the network via network nodes.

5. The method as claimed in claim 4, wherein the interface metric is set based upon the Enhanced Object Tracking protocol.

6. The method as claimed in claim 1, wherein the interface metric is propagated into further networks connected to the network via network nodes.

7. The method as claimed in claim 6, wherein the interface metric is set based upon the Enhanced Object Tracking protocol.

8. The method as claimed in claim 1, wherein the interface metric is propagated by way of an Intermediate System to Intermediate System ("IS-IS") routing protocol, an Enhanced Interior Gateway Routing Protocol ("EIGRP") routing protocol, or an Open Shortest Path First ("OSPF") routing protocol.

9. The method as claimed in claim 8, wherein the interface metric is set based upon the Enhanced Object Tracking protocol.

10. The method as claimed in claim 1, wherein the interface metric is propagated by way of a IS-IS routing protocol and a OSPF routing protocol, a OSPF routing protocol and a EIGRP routing protocol, or a EIGRP routing protocol and a IS-IS routing protocol.

11. The method as claimed in claim 10, wherein the interface metric is set based upon the Enhanced Object Tracking protocol.

12. The method as claimed in claim 1, wherein the interface metric is set based upon the Enhanced Object Tracking protocol.

13. The method as claimed in claim 1, wherein the second network node continues to receive messages from the first network node following the at least partial inaccessibility of the at least one of the network elements detected at an interface of the first network node, the interface of the first network node being the first interface of the first network node.

14. The method as claimed in claim 1, wherein the first interface of the first network node is connected to the first server interface of the server via a first transmission medium and wherein the first interface of the second network node is connected to the second server interface of the server via a second transmission medium.

15. The method as claimed in claim 14, wherein the first transmission medium still functions properly after the at least partial inaccessibility of the at least one of the network elements is detected.

16. The method as claimed in claim 14, wherein at least one of the first transmission medium and the second transmission medium is an Ethernet cable.

17. A system comprising:
a server having a first server interface and a second server interface;
a first network node having a first interface and a second interface, the first interface of the first network node being connected to the first server interface;
a second network node having a first interface and a second interface, the first interface of the second network node being connected to the second server interface;
a plurality of network elements connected to the first network node via the second interface of the first network node and/or the second network node via the second interface of the second network node;
the first network node configured to be a default gateway such that the network elements transmit messages to the server via the first network node;
the second network node configured to become the default gateway when at least partial inaccessibility of at least one of the network elements to the server is detected as occurring at the first interface of the first network node;
at least one of the first network node and the second network node configured to perform a check of an interface metric after the detection of the at least partial inaccessibility of at least one of the network elements when changing the second network node to become the default gateway; and
at least one of the first network node and the second network node configured to adapt the interface metric subsequent to and as a consequence of the at least partial inaccessibility of the at least one of the network elements to the server via the first network node, the adaptation of the interface metric being configured to cause the network elements which would otherwise communicate with the server via the first network node to instead communicate with the server via the second network node to avoid occurrences of asymmetric routing.

18. The system of claim 17 wherein the second network node is configured to receive messages from the first network node after the second network node is set up as the default gateway.

19. The system of claim 17 further comprising a first transmission medium and a second transmission medium, wherein the first interface of the first network node is connected to the first sever interface of the server via the first transmission medium and the first interface of the second network node is connected to the second server interface via the second transmission medium.

20. The system of claim 17 wherein the interface metric is an interface metric of the first interface of the first network node.

* * * * *